(12) United States Patent
M et al.

(10) Patent No.: US 12,079,119 B1
(45) Date of Patent: Sep. 3, 2024

(54) SYSTEMS, METHODS, AND APPARATUSES FOR AUTO-SCALING VOLATILE MEMORY ALLOCATION IN AN ELECTRONIC NETWORK

(71) Applicant: BANK OF AMERICA CORPORATION, Charlotte, NC (US)

(72) Inventors: Karthee M, Chennai (IN); Abhishek Sharma, Navi Mumbai (IN); Sudarshan Sridharan, Navi Mumbai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/122,342

(22) Filed: Mar. 16, 2023

(51) Int. Cl.
  *G06F 12/00* (2006.01)
  *G06F 12/02* (2006.01)
  *G06N 5/022* (2023.01)

(52) U.S. Cl.
  CPC .......... *G06F 12/023* (2013.01); *G06N 5/022* (2013.01)

(58) Field of Classification Search
  CPC ...... G06F 12/023; G06F 3/06; G06F 11/1446; G06F 12/00; G06F 13/16; G06N 5/022
  See application file for complete search history.

(56) References Cited

U.S. PATENT DOCUMENTS

| | | |
|---|---|---|
| 8,427,891 B2 | 4/2013 | Best |
| 9,218,278 B2 | 12/2015 | Talagala |
| 9,767,017 B2 | 9/2017 | Talagala |
| 10,191,778 B1 | 1/2019 | Yang |
| 10,397,240 B2 | 8/2019 | Lewis |
| 10,498,601 B2 | 12/2019 | Ahuja |
| 10,824,409 B2 | 11/2020 | Arumugam |
| 10,834,224 B2 | 11/2020 | Das |
| 10,915,245 B2 | 2/2021 | Stabrawa |

(Continued)

FOREIGN PATENT DOCUMENTS

| | | |
|---|---|---|
| CN | 111480200 A | 7/2020 |
| JP | 7264955 B2 | 4/2023 |

OTHER PUBLICATIONS https://docs.python.org/3/library/multiprocessing.shared_memory.html, retrieved Aug. 25, 2023, 10 pages.

(Continued)

*Primary Examiner* — Arvind Talukdar
(74) *Attorney, Agent, or Firm* — Moore & Van Allen PLLC; Lauren M. Stokes

(57) ABSTRACT

Systems, computer program products, and methods are described herein for auto-scaling volatile memory allocation in an electronic network. The present invention is configured to access metadata of at least one volatile memory component, wherein the metadata is associated with at least one application; determine a current volatile memory allocation for the metadata; determine a current metadata format of the metadata; apply the metadata to a volatile memory allocation machine learning model; generate, based on the application of the metadata to the volatile memory allocation machine learning model, a new volatile memory allocation for the metadata; and apply the new volatile memory allocation to the metadata of the at least one volatile memory component, wherein the application of the new volatile memory allocation to the metadata comprises at least one of an upscaling, a downscaling, or a constant.

20 Claims, 11 Drawing Sheets

(56) References Cited

U.S. PATENT DOCUMENTS

| | | | |
|---|---|---|---|
| 11,044,310 B2 | 6/2021 | Einkauf | |
| 11,094,370 B2 | 8/2021 | Khasawneh | |
| 11,113,647 B2 | 9/2021 | Das | |
| 11,302,374 B2 | 4/2022 | Jenkinson | |
| 11,539,702 B2 | 12/2022 | Washbrook | |
| 11,663,084 B2 | 5/2023 | Luo | |
| 11,669,441 B1 * | 6/2023 | Adogla | G06F 12/1441 711/170 |
| 2019/0179763 A1 | 6/2019 | Lo | |
| 2021/0026837 A1 | 1/2021 | Talagala | |
| 2021/0034422 A1 * | 2/2021 | Burriss | G06F 12/023 |
| 2022/0317903 A1 | 10/2022 | Stabrawa | |
| 2022/0335338 A1 | 10/2022 | Dirac | |
| 2023/0073209 A1 | 3/2023 | Bathe | |

OTHER PUBLICATIONS https://stackoverflow.com/questions/65935719/share-a-file-in-volatile-memory-between-processes-without-ipc, retrieved Aug. 28, 2023, 2 pages.

* cited by examiner

SYSTEMS, METHODS, AND APPARATUSES FOR AUTO-SCALING VOLATILE MEMORY ALLOCATION IN AN ELECTRONIC NETWORK

FIELD OF THE INVENTION

The present invention embraces a system for auto-scaling volatile memory in an electronic environment.

BACKGROUND

Managers of electronic networks and managers of computing devices, such as users of desktop computers, mobile devices, PDAs, tablets, and/or the like, have a harder time than ever determining and implementing efficient volatile memory allocations of metadata. Such issues are further compounded by the fact that volatile memory is only stored for as long as the associated user device/main device is powered on. Thus, and when the user device/main device is powered off, the user and the associated volatile memory allocations are lost forever. Such a necessity to record and/or keep these volatile memory allocations occur where the allocations may be applied to the metadata of the volatile memory in order to improve processing speeds, improve throughput, improve data retention, improve the reduction in replicated metadata, and other such necessary improvements. Thus, there exists a need for an accurate, efficient, automatic, and dynamic system that allows volatile memory allocations to occur in real-time, to occur dynamically, and to be recorded for future allocations, despite the main device being powered off.

Applicant has identified a number of deficiencies and problems associated with auto-scaling volatile memory in an electronic environment. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for auto-scaling volatile memory in an electronic environment is provided. In some embodiments, the system may comprise a memory device with computer-readable program code stored thereon; at least one processing device operatively coupled to the at least one memory device and the at least one communication device, wherein executing the computer-readable code is configured to cause the at least one processing device to: access metadata of at least one volatile memory component, wherein the metadata is associated with at least one application; determine a current volatile memory allocation for the metadata; determine a current metadata format of the metadata; apply the metadata to a volatile memory allocation machine learning model; generate, based on the application of the metadata to the volatile memory allocation machine learning model, a new volatile memory allocation for the metadata; and apply the new volatile memory allocation to the metadata of the at least one volatile memory component, wherein the application of the new volatile memory allocation to the metadata comprises at least one of an upscaling, a downscaling, or a constant.

In some embodiments, the processing device is further configured to: determine a native metadata format of the metadata; determine a unified metadata format, wherein the unified metadata format is associated with a recipient component; apply a modeler component to the metadata of the application, wherein the modeler component comprises the native metadata format associated with the metadata and the unified metadata format; and convert, by the modeler component, the metadata in the native metadata format to a unified metadata comprising the unified metadata format. In some embodiments, the processing device is further configured to: determine a recipient graphical user interface format; convert, by the modeler component, the metadata in the native metadata format to the recipient graphical user interface format; and generate a recipient graphical user interface, wherein the recipient graphical user interface comprises a recipient graphical user interface component based on the recipient graphical user interface format.

In some embodiments, the new volatile memory allocation is applied to the metadata at an immediate period.

In some embodiments, the processing device is further configured to: identify data associated with the application, wherein the data comprises at least one of historical usage data, historical event data, user account data, user account historical usage data, or user account historical event data; create a first training dataset comprising the data associated with the application; and train the volatile memory allocation machine learning model in a first stage using the first training dataset.

In some embodiments, the new volatile memory allocation is applied when the application is currently running or before the application is started on a user device.

In some embodiments, the processing device is further configured to: generate a record of the metadata, wherein the record comprises at least one of the current volatile memory allocation or the new volatile memory allocation; and store the record in a non-volatile memory component.

In some embodiments, the metadata comprises at least one sliced metadata portion or at least one segregated metadata portion. In some embodiments, the processing device is further configured to: generate, based on the application of the metadata to the volatile memory allocation machine learning model, at least one slicing function or at least one segregation function for the metadata; and apply the at least one slicing function or the at least one segregation function to the metadata to generate the at least one sliced metadata portion or the at least one segregated metadata portion. In some embodiments, the processing device is further configured to: apply the at least one sliced metadata portion or the at least one segregated metadata portion to the volatile memory allocation machine learning model; generate, based on the application of the at least one sliced metadata portion or the at least one segregated metadata portion to the volatile memory allocation machine learning model, the new volatile memory allocation for the at least one sliced metadata portion or the at least one segregated metadata portion; and apply the new volatile memory allocation to the at least one sliced metadata portion or the at least one segregated metadata portion.

In some embodiments, the processing device is further configured to generate a memory allocation graphical user interface component to configure a graphical user interface of a user device, wherein the memory allocation graphical user interface component comprises at least one application identifier associated with the at least one application and at least one of the current volatile memory allocation or the new volatile memory allocation. In some embodiments, the processing device is further configured to: receive a volatile memory allocation input from the user device, wherein the volatile memory allocation input comprises a user-input volatile memory allocation for the metadata; and apply the user-input volatile memory allocation to the metadata of the at least one volatile memory component, wherein the application of the user-input volatile memory allocation to the metadata comprises at least one of the upscaling, the downscaling, or the constant. In some embodiments, the processing device is further configured to: create a second training dataset comprising the user-input volatile memory allocation for the metadata; and train the volatile memory allocation machine learning model in a second stage using the second training dataset.

In some embodiments, the processing device is further configured to: encrypt the metadata, wherein the metadata is associated with at least one of the current metadata format or the unified metadata format; share, in response to the encryption, the encrypted metadata to at least one secondary application; determine whether the at least one secondary application comprises an encryption key associated with the encryption of the metadata; validate the encryption key based on the encryption of the metadata; and allow, in an instance where the encryption key of the at least one secondary application is validated, access to the metadata associated with at least one of current metadata format or the unified metadata format.

In another aspect, a computer program product for auto-scaling volatile memory allocation is provided. In some embodiments, the computer program product may comprise at least one non-transitory computer-readable medium having computer-readable program code portions embodied therein, the computer-readable program code portions which when executed by a processing device are configured to cause the processor to: access metadata of at least one volatile memory component, wherein the metadata is associated with at least one application; determine a current volatile memory allocation for the metadata; determine a current metadata format of the metadata; apply the metadata to a volatile memory allocation machine learning model; generate, based on the application of the metadata to the volatile memory allocation machine learning model, a new volatile memory allocation for the metadata; and apply the new volatile memory allocation to the metadata of the at least one volatile memory component, wherein the application of the new volatile memory allocation to the metadata comprises at least one of an upscaling, a downscaling, or a constant.

In some embodiments, the processing device is configured to cause the processor to: determine a native metadata format of the metadata; determine a unified metadata format, wherein the unified metadata format is associated with a recipient component; apply a modeler component to the metadata of the application, wherein the modeler comprises the native metadata format associated with the metadata and the unified metadata format; and convert, by the modeler component, the metadata in the native metadata format to a unified metadata comprising the unified metadata format. In some embodiments, the processing device is configured to cause the processor to: determine a recipient graphical user interface format; convert, by the modeler component, the metadata in the native metadata format to the recipient graphical user interface format; and generate a recipient graphical user interface, wherein the recipient graphical user interface comprises a recipient graphical user interface component based on the recipient graphical user interface format.

In another aspect, a computer-implemented method for auto-scaling volatile memory allocation is provided. In some embodiments, the computer-implemented method may comprise: accessing metadata of at least one volatile memory component, wherein the metadata is associated with at least one application; determining a current volatile memory allocation for the metadata; determining a current metadata format of the metadata; applying the metadata to a volatile memory allocation machine learning model; generating, based on the application of the metadata to the volatile memory allocation machine learning model, a new volatile memory allocation for the metadata; and applying the new volatile memory allocation to the metadata of the at least one volatile memory component, wherein the application of the new volatile memory allocation to the metadata comprises at least one of an upscaling, a downscaling, or a constant.

In some embodiments, the computer-implemented method may further comprise: determining a native metadata format of the metadata; determining a unified metadata format, wherein the unified metadata format is associated with a recipient component; applying a modeler component to the metadata of the application, wherein the modeler comprises the native metadata format associated with the metadata and the unified metadata format; and converting, by the modeler component, the metadata in the native metadata format to a unified metadata comprising the unified metadata format. In some embodiments, the computer-implemented method may further comprise: determining a recipient graphical user interface format; converting, by the modeler component, the metadata in the native metadata format to the recipient graphical user interface format; and generating a recipient graphical user interface, wherein the recipient graphical user interface comprises a recipient graphical user interface component based on the recipient graphical user interface format.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
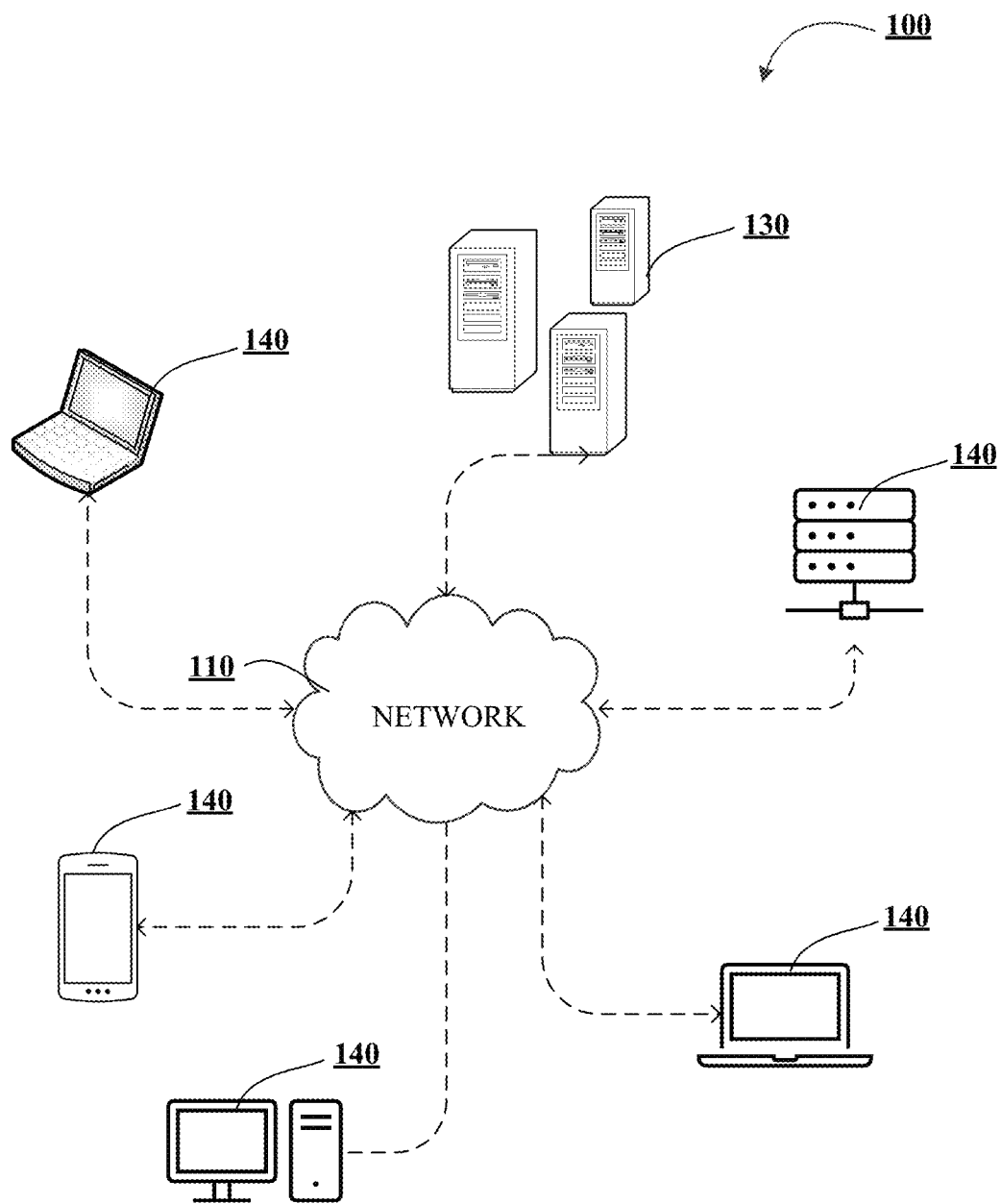
Figure 1B:
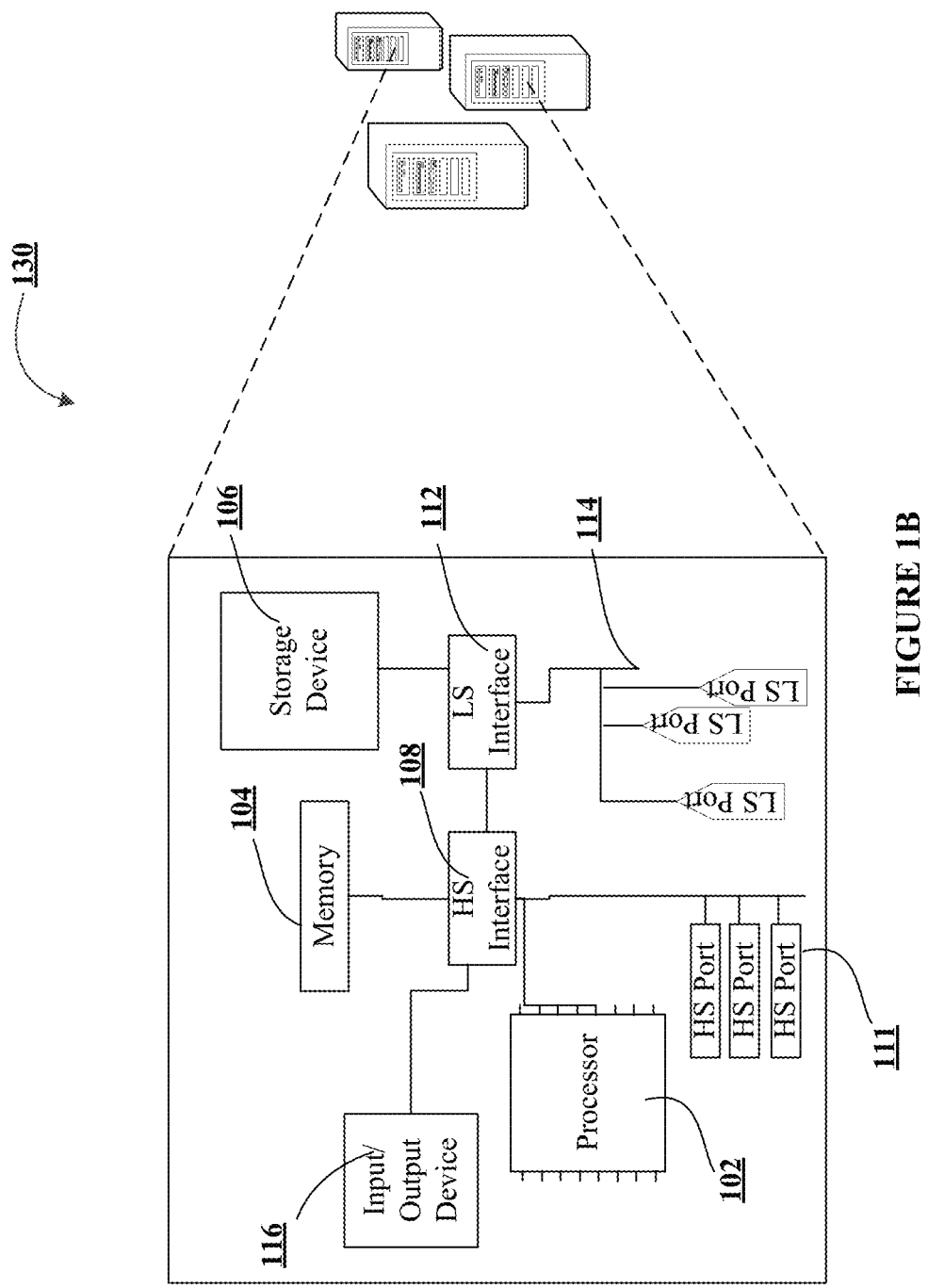
Figure 1C:
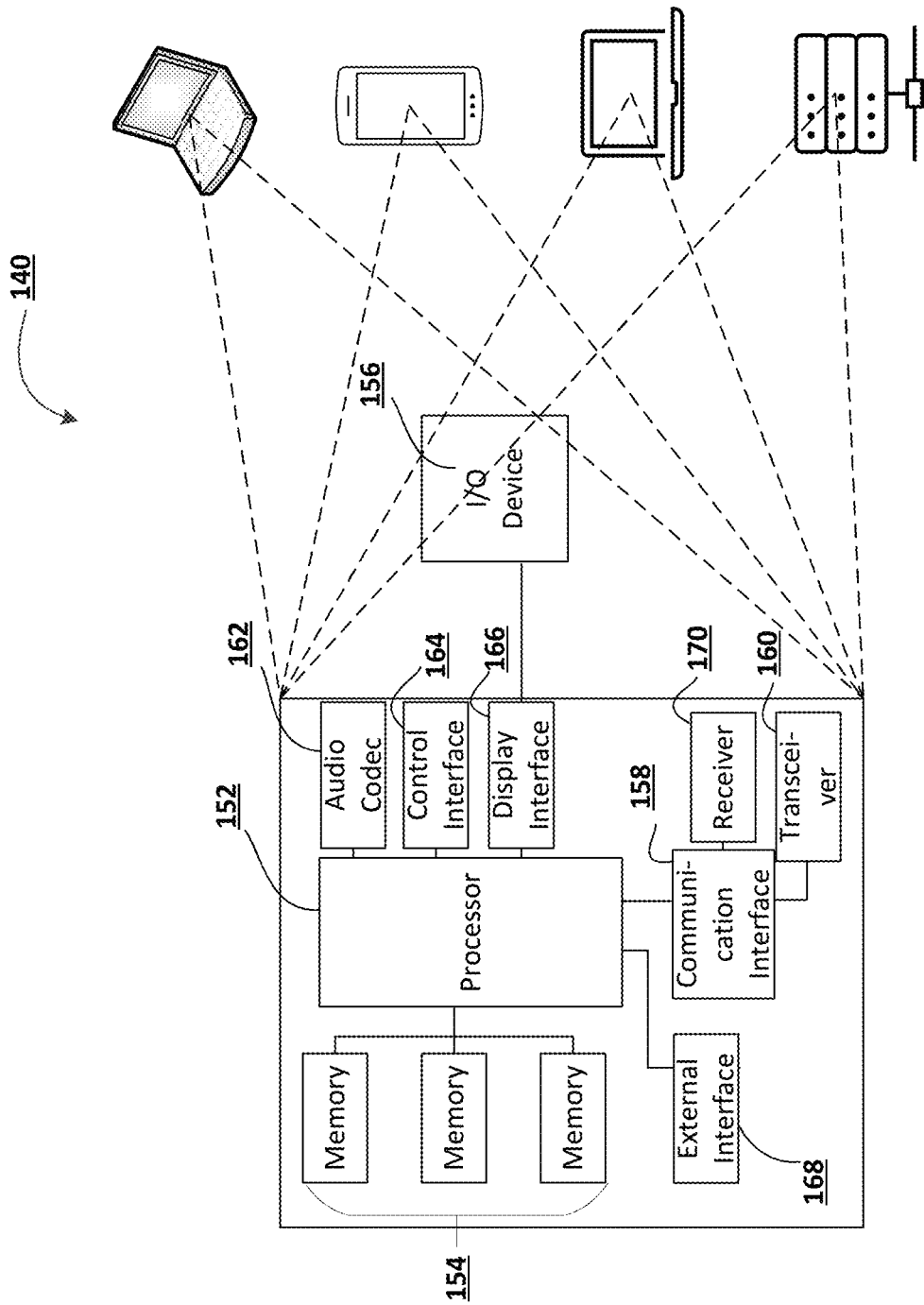
Figure 2:
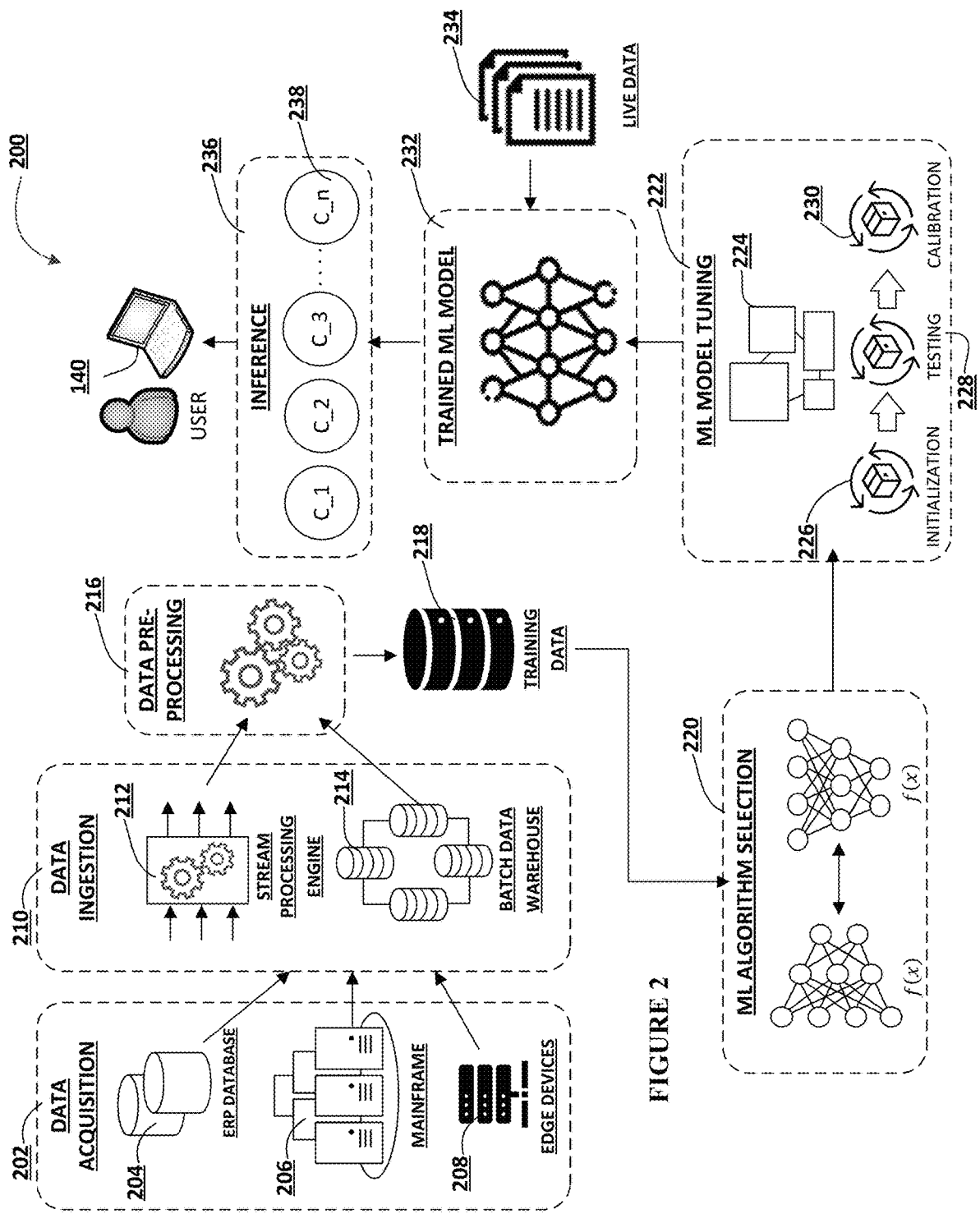
Figure 3:
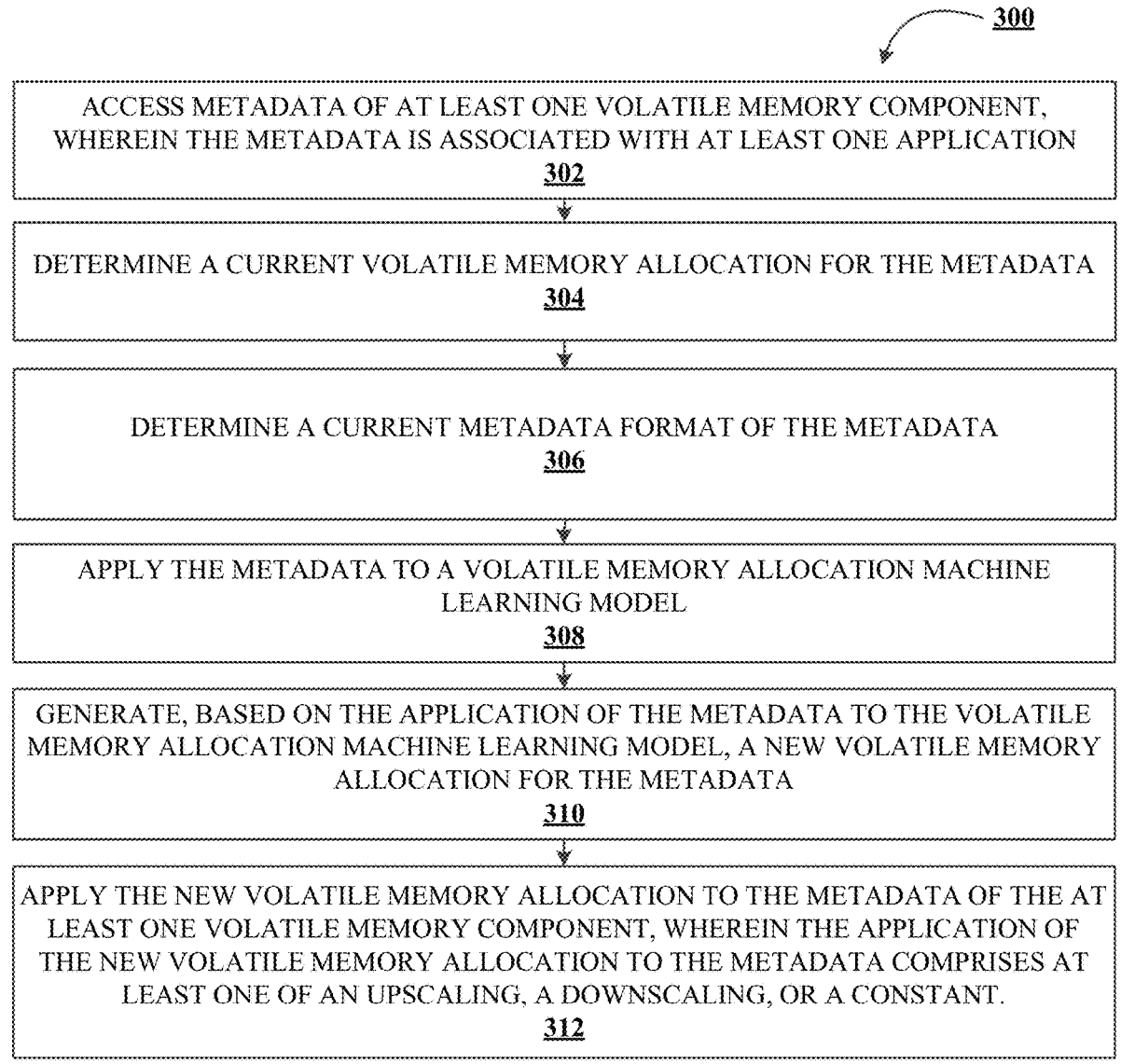
Figure 4:
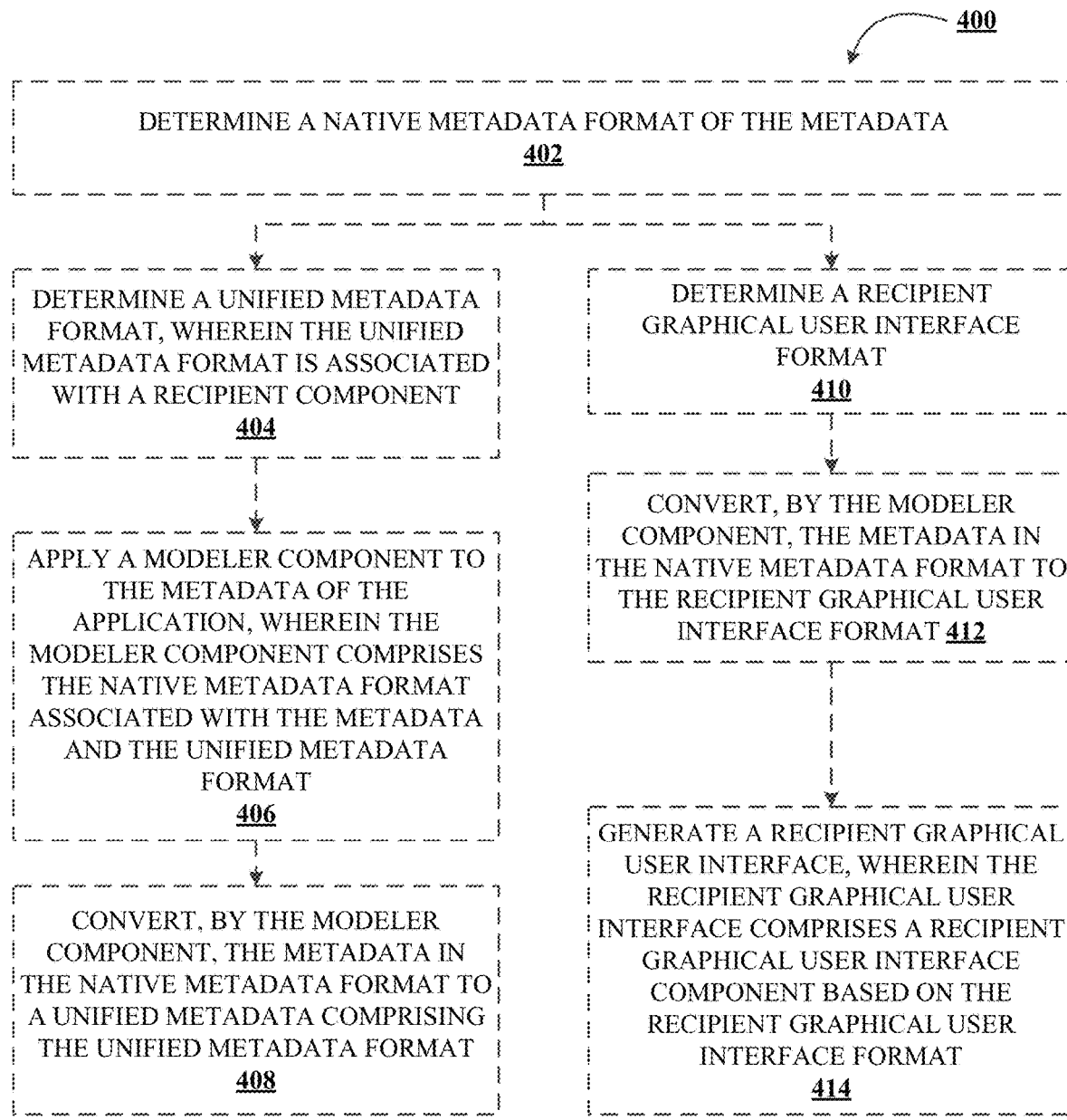
Figure 5:
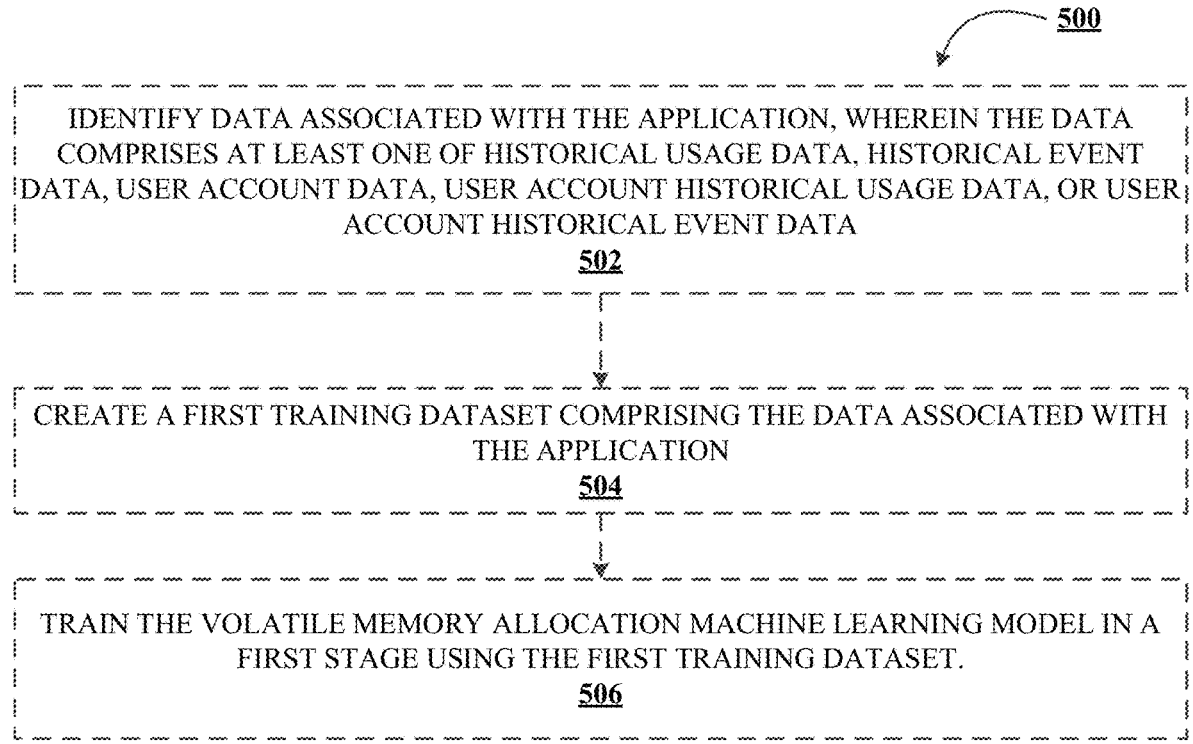
Figure 6:
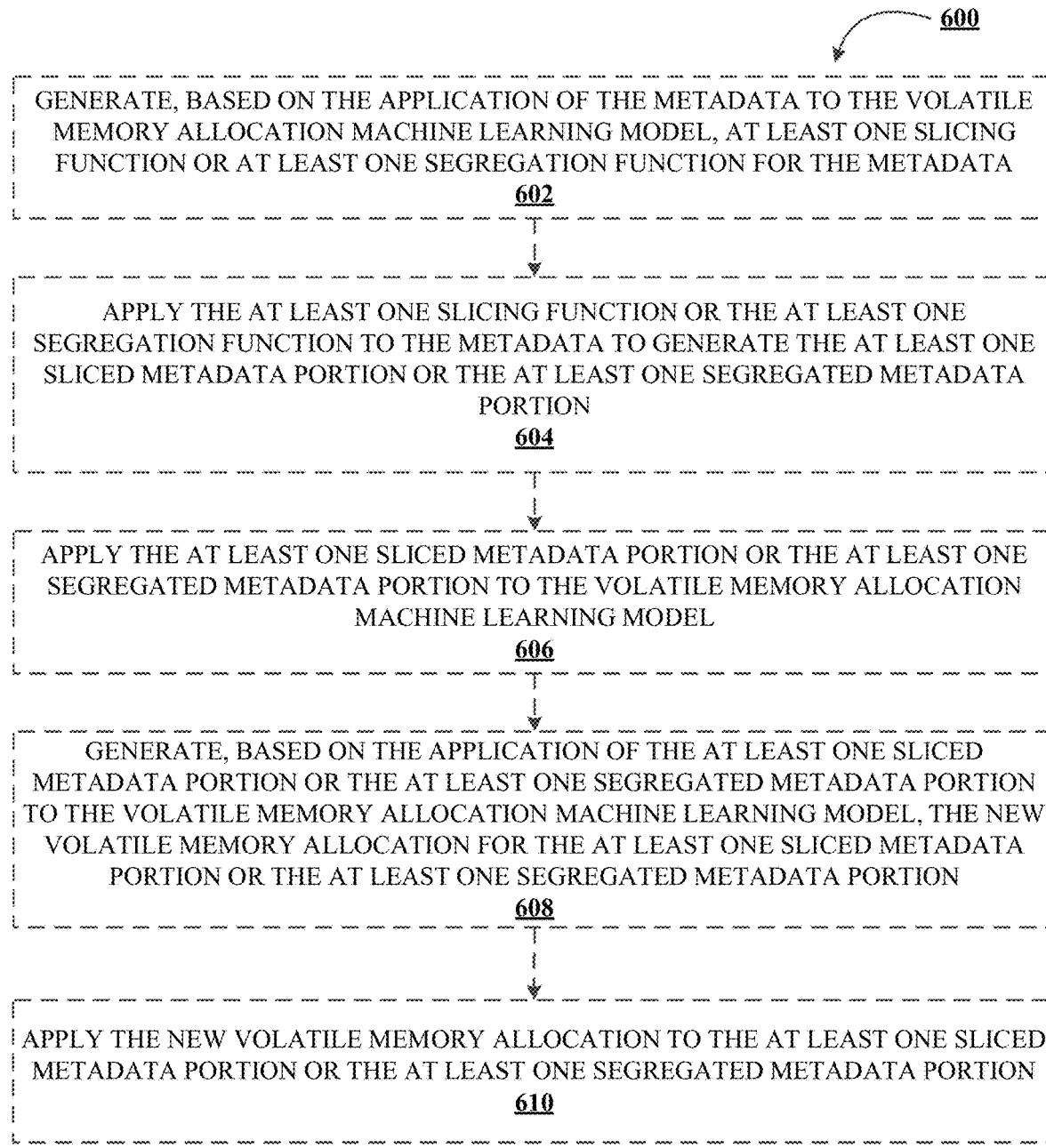
Figure 7:
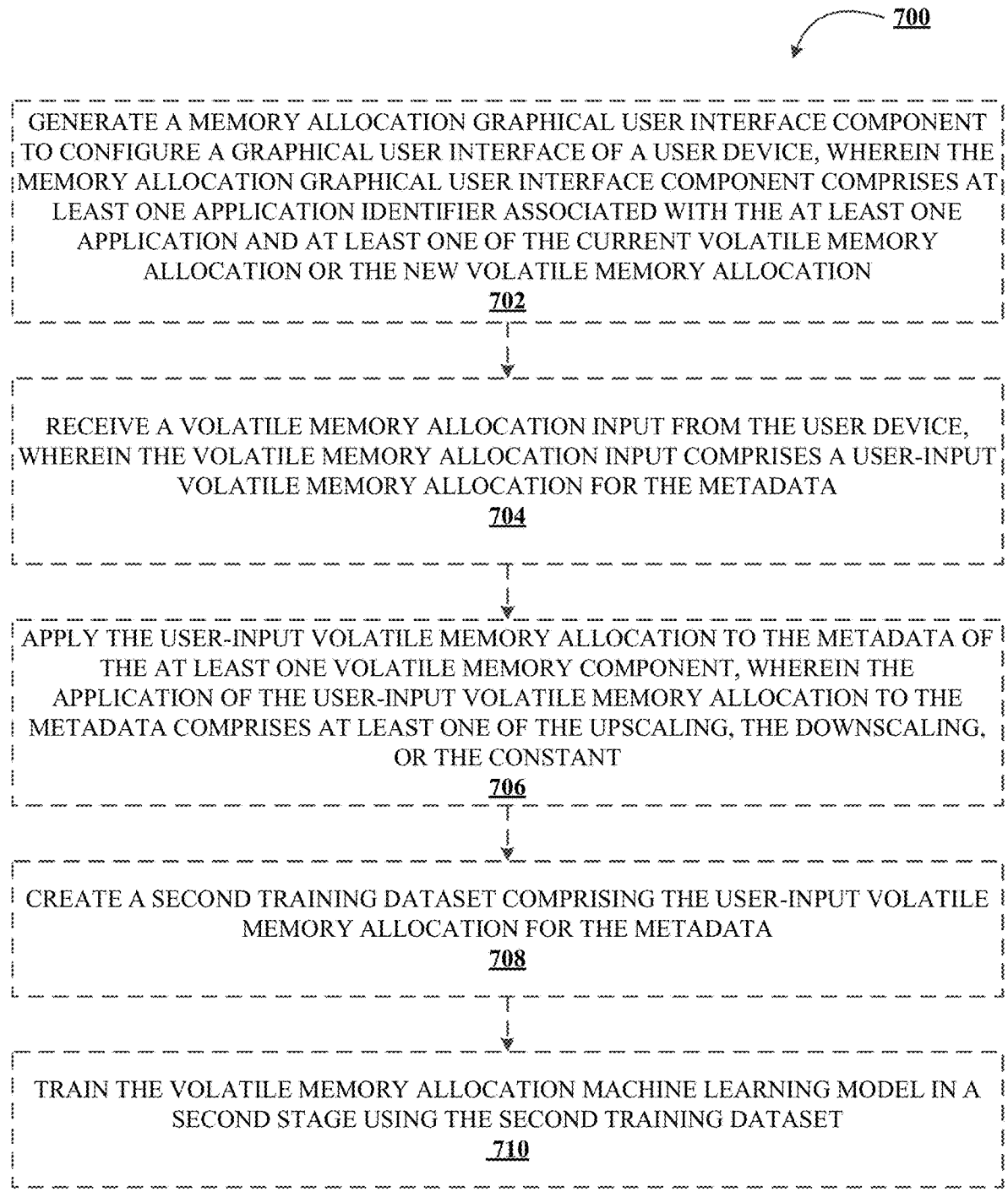
Figure 8:
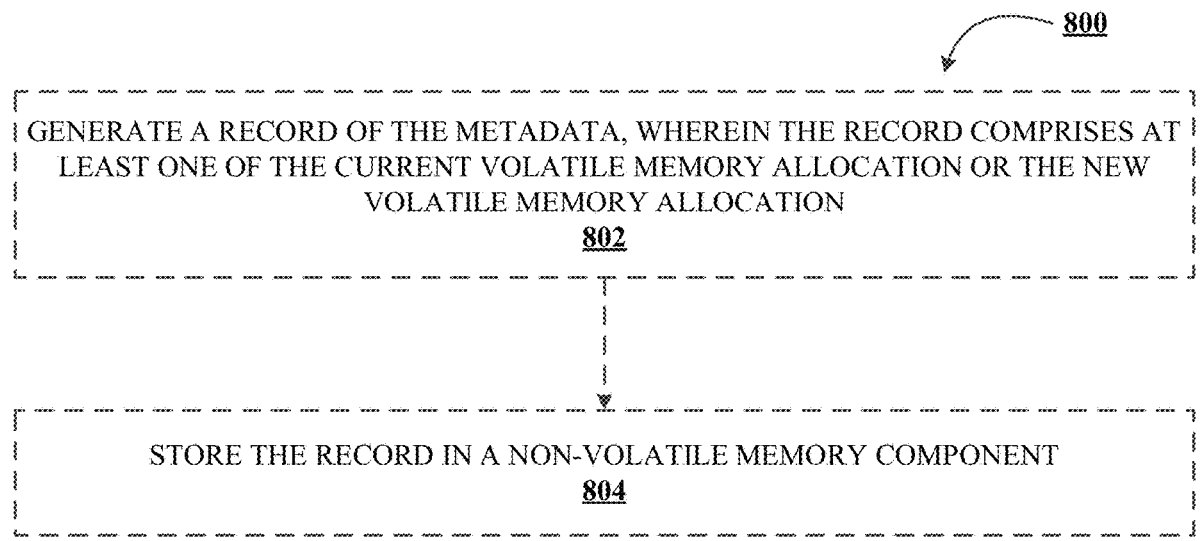
Figure 9:
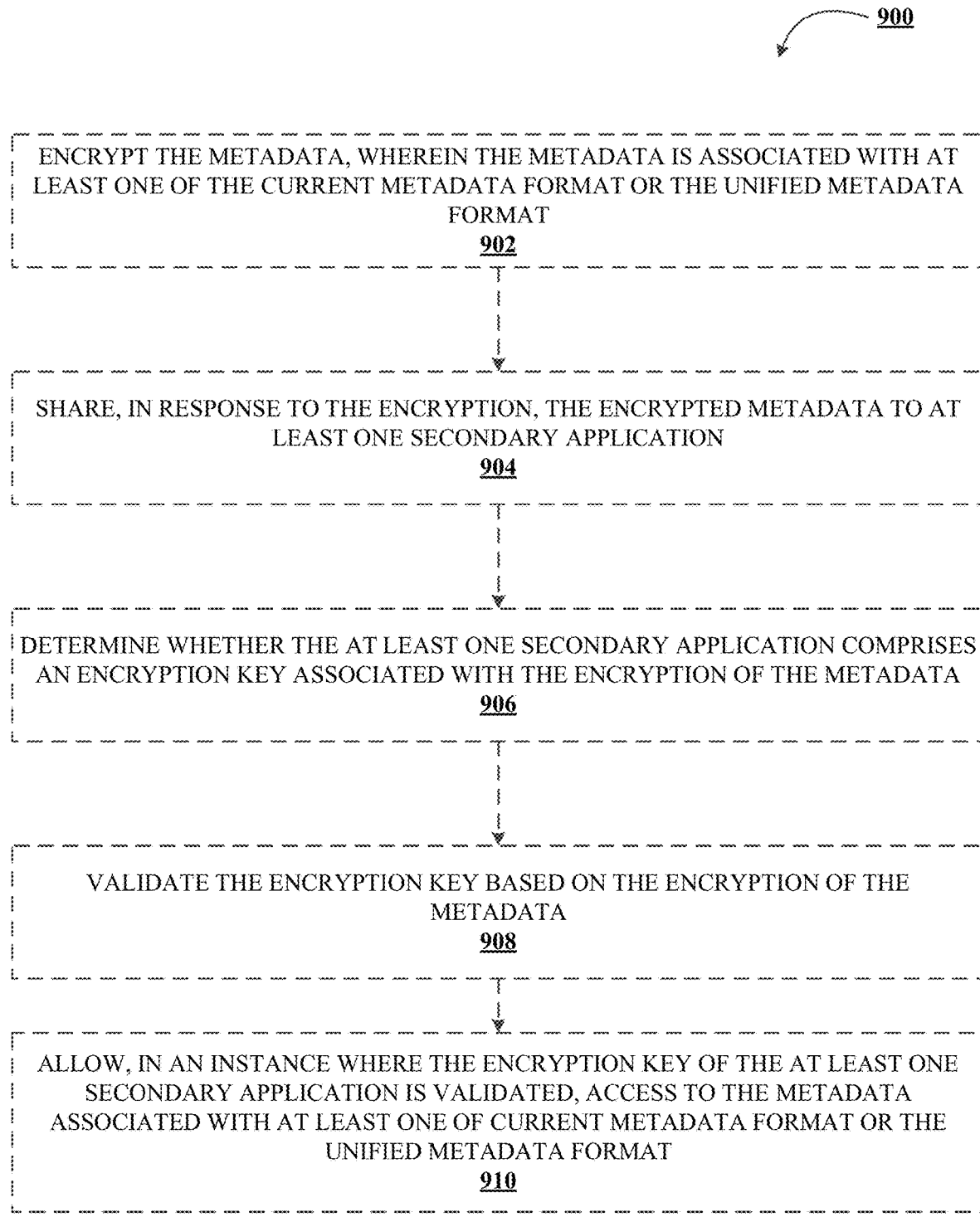

Having thus described embodiments of the invention in general terms, reference will now be made the accompanying drawings, wherein:

FIGS. 1A-1C illustrates technical components of an exemplary distributed computing environment for auto-scaling volatile memory in an electronic environment, in accordance with an embodiment of the disclosure;

FIG. 2 illustrates an exemplary machine learning environment and associated electronic components, in accordance with an embodiment of the disclosure;

FIG. 3 illustrates a process flow for auto-scaling volatile memory in an electronic environment, in accordance with an embodiment of the disclosure;

FIG. 4 illustrates a process flow for generating a recipient graphical user interface component to configure a graphical user interface of a user device, in accordance with an embodiment of the disclosure;

FIG. 5 illustrates a process flow for training a volatile memory allocation machine learning model, in accordance with an embodiment of the disclosure;

FIG. 6 illustrates a process flow for applying the new volatile memory allocation to at least one of a sliced metadata portion or at least one of a segregated metadata portion, in accordance with an embodiment of the disclosure;

FIG. 7 illustrates a process flow for training the volatile memory allocation machine learning model based at least on a user-input volatile memory allocation, in accordance with an embodiment of the disclosure;

FIG. 8 illustrates a process flow for storing a generating and storing a record of the metadata, in accordance with an embodiment of the disclosure; and FIG. 9 illustrates a process flow for allowing access to the metadata using encryption, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Managers of electronic networks and managers of computing devices, such as users of desktop computers, mobile devices, PDAs, tablets, and/or the like, have a harder time than ever determining and implementing efficient volatile memory allocations of metadata. Such issues are further compounded by the fact that volatile memory is only stored for as long as the associated user device/main device is powered on. Thus, and when the user device/main device is powered off, the user and the associated volatile memory allocations are lost forever. Such a necessity to record and/or keep these volatile memory allocations occur where the allocations may be applied to the metadata of the volatile memory to improve processing speeds, improve throughput, improve data retention, improve the reduction in replicated metadata, and other such necessary improvements. Thus, there exists a need for an accurate, efficient, automatic, and dynamic system that allows volatile memory allocations to occur in real-time, to occur dynamically, streamline the memory allocations and memory organization of the metadata, and to be recorded for future allocations, despite the main device being powered off.

As described herein, the disclosure is directed to a volatile memory allocation system which accurately, efficiently, automatically, and dynamically determines and implements a volatile memory allocation for metadata. In this manner, the volatile memory allocation system is configured to allocate memory storage to volatile metadata based on the shared metadata among different applications, historic events of the metadata and associated application(s), historical usage of the metadata and associated application(s), and/or the like. Such a determination of the volatile memory allocation may be made by an artificial intelligence engine and/or a machine learning model using an artificial neural network trained to look at the shared data, historical events, and historical usage and output a scaling parameter (e.g., scaling the memory allocation up or down and/or keeping the memory allocation constant). In some embodiments, the scaling parameter may be controlled via a user interface, whereby a manager of the volatile memory can scale the memory allocation directly and/or after the artificial intelligence engine and/or machine learning model has made its determination. Further, and in some embodiments, the volatile memory allocation system may comprise a modeler component to convert the volatile memory allocated to the metadata which can be modeled in an end-user format (e.g., a consumer format), such as to quickly load a webpage from cache data. In some embodiments, the volatile memory allocation system may further comprise a record of the cache data stored in non-volatile memory, such as a hard drive or disk drive, for recovery of the historical events, historical usage, previous volatile memory allocation(s), previous auto-scaling, and/or the like. Thus, and as described herein, the volatile memory allocation system is configured to solve the above problems identified herein.

Accordingly, the volatile memory allocation system acts by accessing metadata of at least one volatile memory component (e.g., cache, random access memory (RAM), and/or the like), wherein the metadata is associated with at least one application; determining a current volatile memory allocation for the metadata; and determining a current metadata format of the metadata (e.g., the current and/or native programming language, the operating system, and/or the like). The volatile memory allocation system may further act by applying the metadata to a volatile memory allocation machine learning model; generating, based on the application of the metadata to the volatile memory allocation machine learning model, a new volatile memory allocation for the metadata; and applying the new volatile memory allocation to the metadata of the at least one volatile memory component, wherein the application of the new volatile memory allocation to the metadata comprises at least one of an upscaling, a downscaling, or a constant.

What is more, the present invention provides a technical solution to a technical problem. As described herein, the technical problem includes the accurate, efficient, automatic, and dynamic determination and implementation of volatile memory allocations for metadata. The technical solution presented herein allows for a volatile memory allocation system which accurately, efficiently, dynamically, and automatically determines and implements a volatile memory allocation to metadata associated with a volatile memory component. Further still, the volatile memory allocation system also allows for record keeping of the volatile memory allocations, such that the volatile memory allocations may be used at a future time, despite the main device/user device being powered off. In particular, the volatile memory allocation system is an improvement over existing solutions to the determination and implementation of volatile memory allocations for metadata, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for auto-scaling volatile memory 100, in accordance with an embodiment of the invention. As shown in FIG. 1A, the distributed computing environment 100 contemplated herein may include a system 130 (i.e., a volatile memory allocation system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236. In some embodiments, the machine learning model like that shown as machine learning subsystem 200 may be configured to act in conjunction with an artificial neural network (ANN), such that the combination of the machine learning model and ANN will allow a greater likelihood of decision making regarding the volatile memory allocations and associated scaling.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm %20 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for auto-scaling volatile memory in an electronic environment, in accordance with an embodiment of the disclosure. In some embodiments, a system (e.g., similar to one or more of the systems described herein with respect to FIGS. 1A-1C and 2) may perform one or more of the steps of process flow 300. For example, a volatile memory allocation system (e.g., the system 130 described herein with respect to FIG. 1A-1C) may perform the steps of process 300, which may further be configured to implement at least one machine learning and/or an artificial intelligence engine (e.g., such as machine learning model 200 shown in FIG. 2) to perform the steps of process 300.

As shown in block 302, the process flow 300 may include the step of accessing metadata of at least one volatile memory component, wherein the metadata is associated with at least one application.

As used herein the term, non-volatile memory component shall refer to an electronic storage component designed to store data on a short-term basis, such as when a user device and/or the main device associated with the volatile memory component is powered on. For instance, and in some embodiments, the volatile memory component may be configured to store metadata comprising cache data/cache memory, Random Access Memory (RAM), and/or the like. By way of non-limiting example, the metadata stored in this volatile memory may be used to quickly download a page of an application and show the data on a graphical user interface associated with the main device/user device, without waiting for a complete download of the application from a server associated with the application over a network. In some embodiments, the volatile memory component may comprise a plurality of volatile memory modules and/or a single volatile memory module, whereby each volatile memory module may comprise the metadata associated with one application, a plurality of applications, and/or the like.

As used herein, the term application shall refer to a computer software package that is downloaded onto a main device/user device, a website which may be accessed over a network by the main device/user device through a communication over a network (e.g., network 110) to a server associated with the website, and/or the like.

By way of non-limiting example, the volatile memory allocation system may access the metadata of the at least one volatile memory component by interrogating the volatile memory component and its associated volatile memory module(s), such that the volatile memory allocation system may determine the metadata stored on each of the volatile memory module(s).

As shown in block 304, the process flow 300 may include the step of determining a current volatile memory allocation for the metadata. By way of non-limiting example, the volatile memory allocation system may determine the current volatile memory allocation of each metadata for each associated application stored within the volatile memory component by interrogating the volatile memory component (e.g., by interrogating the volatile memory module(s) associated with the volatile memory component). As used herein, the volatile memory allocation (which may be used in the terms, current volatile memory allocation, new volatile memory allocation, and/or user-input volatile memory allocation), refers to the storage allocation of the metadata within the volatile memory component. In some embodiments, the storage allocation may comprise units of kilobyte (KB), megabyte (MB), gigabyte (GB), and/or the like. Thus, and as described in further detail herein, the volatile memory allocation may be determined at a current period (e.g., to generate the current volatile memory allocation), may be determined for a future period (e.g., to generate the new volatile memory allocation which may be applied to the metadata in the volatile memory component and/or a user-input volatile memory allocation which may also be applied to the metadata in the volatile memory component).

As shown in block 306, the process flow 300 may include the step of determining a current metadata format of the metadata. By way of non-limiting example, the volatile memory allocation system may determine the current metadata format of the metadata by further interrogating at least one of the application associated with the metadata, the metadata stored in the volatile memory component, the main device/user device which has downloaded and/or is accessing the application, and/or the like. As used herein, the metadata format refers to at least one of a programming language of the application, an operating system of the application, and/or the like. Thus, and in some embodiments, the volatile memory allocation system may determine a current metadata format of the metadata as comprising a particular programming language and as being stored on a particular operating system for the application at a current period. In some embodiments, the current metadata format may comprise the native format of the metadata, such that the current metadata format (e.g., programming language, operating system, and/or the like is the original/native format of the application as it was originally downloaded or accessed by the main device/user device.

As shown in block 308, the process flow 300 may include the step of applying the metadata to a volatile memory allocation machine learning model. By way of non-limiting example, the volatile memory allocation system may apply the metadata to a volatile memory allocation machine learning model, which has been trained to determine at least a new volatile memory allocation for the metadata. In some embodiments, the volatile memory allocation machine learning model may be trained with at least one training data set, which is described in further detail below with respect to FIGS. 5, 6 and 7.

As shown in block 310, the process flow 300 may include the step of generating-based on the application of the metadata to the volatile memory allocation machine learning model-a new volatile memory allocation for the metadata. By way of non-limiting example, the system may generate—by the volatile memory allocation machine learning model—at least a new volatile memory allocation for the metadata based on determine what a new volatile memory storage allocation should be for the metadata.

As shown in block 312, the process flow 300 may include the step of applying the new volatile memory allocation to the metadata of the at least one volatile memory component, wherein the application of the new volatile memory allocation to the metadata comprises at least one of an upscaling, a downscaling, or a constant. In some embodiments, and once the new volatile memory allocation has been determined by the volatile memory allocation machine learning model, the volatile memory allocation system may apply the new volatile memory allocation to the metadata in the current metadata format to generate a new memory storage allocation in the volatile memory component. In some embodiments, the new volatile memory allocation may comprise at least one of an upscaling, a downscaling, and/or a constant applied to the metadata.

As used herein, the upscaling may comprise an increasing of the memory storage allocation within the volatile memory component for the metadata. The downscaling, as used herein, may comprise a decreasing of the memory storage allocation within the volatile memory component for the metadata. Additionally and in some embodiments, the; constant may comprise the memory storage allocation of the metadata remaining at the current memory allocation, such that the volatile memory allocation of the metadata does not change.

In some embodiments, the volatile memory allocation system may apply the new volatile memory allocation at an immediate time to determining the new volatile memory allocation, at a later time, and/or at a later time based on an authentication by a user of the user device that the new volatile memory allocation is allowed to be applied to the metadata. By way of non-limiting example, the new volatile memory allocation may be applied to the metadata of the application as it is running on the user device/main device, such that the new volatile memory allocation is applied in real-time to the metadata and the metadata memory allocation is automatically updated.

FIG. 4 illustrates a process flow 400 for generating a recipient graphical user interface component to configure a graphical user interface of a user device, in accordance with an embodiment of the disclosure. In some embodiments, a system (e.g., similar to one or more of the systems described herein with respect to FIGS. 1A-1C and 2) may perform one or more of the steps of process flow 400. For example, a volatile memory allocation system (e.g., the system 130 described herein with respect to FIG. 1A-1C) may perform the steps of process 400, which may further be configured to implement at least one machine learning and/or an artificial intelligence engine (e.g., such as machine learning model 200 shown in FIG. 2) to perform the steps of process 400.

As shown in block 402, the process flow 400 may include the step of determining a native metadata format of the metadata. Native=original and/or current format of the metadata. By way of non-limiting example, the native metadata format may be used to refer to the original metadata format of the application as it is stored on the user device/main device and/or as it is accessed by the user device/main device.

In some embodiments, the processes described herein with respect to FIG. 4 may occur at an earlier time to the processes described in FIG. 3, at a later time to the processes described in FIG. 3, and/or in parallel to the processes described in FIG. 3.

As shown in block 404, the process flow 400 may include the step of determining a unified metadata format, wherein the unified metadata format is associated with a recipient component. In some embodiments, the unified metadata format may be associated with a metadata format of the volatile memory allocation system, of the majority of applications associated with the volatile memory allocation system (e.g., the majority of applications stored and/or accessed by the main device/user device), a central server of the volatile memory allocation system where the volatile memory allocation system is not hosted within the main device/user device, and/or the like. In this manner, the volatile memory allocation system may determine a unified metadata format that each of the metadata from the at least one application(s) stored and/or accessed by the volatile memory allocation system should be converted to in order to have a unified metadata format for all the applications associated with the volatile memory allocation system on the main device/user device.

In some embodiments, the unified metadata format may be based on a recipient component, such as a recipient device which may be associated with a consumer/user of the application, whereby the recipient device may have its own metadata format (e.g., its own programming language and/or its own operating system).

As shown in block 406, the process flow 400 may include the step of applying a modeler component to the metadata of the application, wherein the modeler component comprises the native metadata format associated with the metadata and the unified metadata format. By way of non-limiting example, the volatile memory allocation system may be configured to recognize both of native metadata format and the unified metadata format and determine how to convert the metadata in the native metadata format to the metadata in the unified metadata format. In some embodiments, the modeler component may be used to configure the application, such that the modeler component is "downloaded" to the application and sits within the operating code of the application, within the main device/user device. In this manner, the modeler component of the volatile memory allocation system will know and understand the native metadata format of the application and its metadata, and also be configured with the unified metadata format associated with the volatile memory allocation system.

As shown in block 408, the process flow 400 may include the step of converting—by the modeler component—the metadata in the native metadata format to a unified metadata comprising the unified metadata format. In this manner, and in some embodiments, the modeler component may be configured to communicate between the application and its associated native format of the metadata and a component comprising the unified metadata format (such as a volatile memory allocation system, like that described herein) and allow the configuration of the metadata from the native metadata format to the unified metadata format. In some embodiments, the native metadata format and the unified metadata format may be the same, and thus, the modeler component may directly output the original metadata of the application to the volatile memory allocation system for other processes described herein to be performed, such as the sharing of the metadata, the memory allocation for the volatile memory component, and/or the like.

In some embodiments, the use of the unified metadata format for each of the applications associated with main device/user device may allow the volatile memory allocation system to determine any replicated metadata from applications associated with the main device/user device, and whereby such replicated data may be consolidated to one module of storage within the volatile memory (e.g., a volatile memory module) to allow higher processing speeds, greater storage capabilities, streamlined volatile memory allocations, higher throughput, and/or the like.

In some embodiments, and as shown in block 410, the process flow 400 may include the step of determining a recipient graphical user interface format. By way of non-limiting example, the volatile memory allocation system may determine a recipient graphical user interface associated with a recipient, such as associated with a consumer/end-user. In those embodiments, the volatile memory allocation system may further determine an end-user format associated with the end-user device and its associated graphical user interface.

In some embodiments, and as shown in block 412, the process flow 400 may include the step of converting—by the modeler component—the metadata in the native metadata format to the recipient graphical user interface format. For instance, a consumer/end-user device may be in communication with the volatile memory allocation system over a network, such as network 110 of FIG. 1A, whereby the end-user device may request access to the original metadata of the application, but in a format which the end-user device can access and use to configure its graphical user interface. In some embodiments, the end-user device may be the same as the main device. Thus, and in this manner, the volatile memory allocation system may be configured to convert the original format/native format of the application metadata to a metadata format that can be read and used by the end-user device and/or the main device/user device.

In some embodiments, and as shown in block 414, the process flow 400 may include the step of generating a recipient graphical user interface, wherein the recipient graphical user interface comprises a recipient graphical user interface component to configure the recipient graphical user interface, whereby the recipient graphical user interface component comprises the recipient graphical user interface format. By way of non-limiting example, the recipient graphical user interface component may be transmitted from the volatile memory allocation system, over a network (e.g., network 110), to the end-user device to configure the graphical user interface of the end-user device to show the metadata of the application on the recipient graphical user interface format.

FIG. 5 illustrates a process flow 500 for training a volatile memory allocation machine learning model, in accordance with an embodiment of the disclosure. In some embodiments, a system (e.g., similar to one or more of the systems described herein with respect to FIGS. 1A-1C and 2) may perform one or more of the steps of process flow 500. For example, a volatile memory allocation system (e.g., the system 130 described herein with respect to FIG. 1A-1C) may perform the steps of process 500, which may further be configured to implement at least one machine learning and/or an artificial intelligence engine (e.g., such as machine learning model 200 shown in FIG. 2) to perform the steps of process 500.

As shown in block 502, the process flow 500 may include the step of identifying data associated with the application, wherein the data comprises at least one of historical usage data, historical event data, user account data, user account historical usage data, and/or user account historical event data.

By way of non-limiting example, the historical usage data may comprise the historical usage data of the application from a plurality of main devices, whereby the plurality of main devices is associated with a plurality of users and their associated user accounts. For instance, and where the plurality if main devices is associated with a plurality of users, the volatile memory allocation system may consider the amount of usage each application has incurred on each of the main devices and from each of the plurality of users. In this manner, the volatile memory allocation system may determine the overall usage of application(s) across a plurality of users.

Historical event data may comprise the data of the application from a plurality of main devices, whereby the plurality of main devices may be associated with a plurality of users and associated user accounts. For instance, and where the plurality if main devices is associated with a plurality of users, the volatile memory allocation system may consider data from a plurality of users and their historical interactions with the application and associated usages (e.g., what particular application components the user(s) interacted with after accessing the application and what those particular interactions comprised). In some embodiments the application components and the event data from each of the plurality of users may comprise each interaction within the application, including uncompleted tasks/actions, completed tasks/actions, every interaction (every view, every click, every input, and/or the like), and/or the like.

User account historical usage data may comprise the historical usage data of the application from a plurality of main devices, whereby the plurality of main devices may be associated with a particular user account (e.g., whereby the particular user is in control of the plurality of the main devices and whereby the user account has been accessed by the plurality of main devices). For instance, and where the plurality if main devices is associated with the user, the volatile memory allocation system may consider data from the plurality of user devices to determine the user account's historical usage data of the application despite the use of multiple devices to access the application.

User account historical event data may comprise the data of the application from a plurality of main devices, whereby the plurality of main devices may be associated with a particular user (e.g., whereby the particular user is in control of the plurality of the main devices) and/or associated with a plurality of users. For instance, and where the plurality if main devices is associated with the user, the volatile memory allocation system may consider data from the plurality of user devices to determine the user account's historical event data of the application despite the use of multiple devices to access the application. Similar to the event data described above with respect to historical event data, the same event types may be used here (e.g., each of the interactions involved in each application, by the user).

Such data associated with the application may be stored in a repository of the volatile memory allocation system and may be periodically updated and/or immediately/automatically updated each time each application is interacted with.

As shown in block 504, the process flow 500 may include the step of creating a first training dataset comprising the data associated with the application. Such a first training dataset may comprise each of the data described above with respect to block 502, which may be used by the volatile memory allocation system to train a machine learning model, such as the volatile memory allocation machine learning model.

As shown in block 506, the process flow 500 may include the step of training the volatile memory allocation machine learning model in a first stage using the first training dataset. Such a training may comprise an application of the first training dataset to the volatile memory allocation machine learning model, whereby the volatile memory allocation machine learning model may be trained to look for which applications and their associated metadata are interacted with the most, interacted with the longest, and at what periods of time and/or at what locations. In this manner, the volatile memory allocation machine learning model may determine a greater volatile memory allocation for the metadata associated with applications interacted with the most/interacted with the longest. Further, and in some embodiments, the volatile memory allocation machine learning model may be configured to further determine which time periods and/or locations the metadata is interacted with the most and/or the least, and may periodically and dynamically update the new volatile memory allocation based on this data, such that the volatile memory allocation may change depending on the time period and/or the location.

FIG. 6 illustrates a process flow 600 for applying the new volatile memory allocation to at least one of a sliced metadata portion or at least one of a segregated metadata portion, in accordance with an embodiment of the disclosure. In some embodiments, a system (e.g., similar to one or more of the systems described herein with respect to FIGS. 1A-1C and 2) may perform one or more of the steps of process flow 600. For example, a volatile memory allocation system (e.g., the system 130 described herein with respect to FIG. 1A-1C) may perform the steps of process 600, which may further be configured to implement at least one machine learning and/or an artificial intelligence engine (e.g., such as machine learning model 200 shown in FIG. 2) to perform the steps of process 600.

In some embodiments, and as shown in block 602, the process flow 600 may include the step generating-based on the application of the metadata to the volatile memory allocation machine learning model—at least one slicing function or at least one segregation function for the metadata. By way of non-limiting example, the volatile memory allocation system may generate a slicing function and/or segregation function to apply to the metadata, whereby the slicing function and/or the segregation function may be used to reduce the memory allocation portions used for the overall metadata by slicing the metadata and/or segregating the metadata. In some embodiments, the segregated metadata and its associated segregated function to generate the segregated metadata may be used to sort and/or organize the metadata and/or metadata portions into particular volatile memory modules. Thus, and in some embodiments, the segregation of the metadata and/or the metadata portions into particular volatile memory modules may be used to determine whether the metadata has replicated data stored in the volatile memory component based on sorting the metadata and/or metadata portions into the volatile memory modules that comprise the same or similar metadata. In this manner, and in some embodiments, the volatile memory allocation system may delete replicated metadata such that only one copy and/or a pre-determined number of copies is saved within the volatile memory, such as for the purpose of recalling a copy of the metadata where another copy has been corrupted.

As used herein, the segregation function may comprise a computer program configured to segregate the metadata based on a determination by the volatile memory allocation system, such as by the volatile memory allocation machine learning model, how to separate and sort the metadata into the volatile memory modules. In some embodiments, the segregation function may comprise separating the metadata (e.g., based on metadata format, such as separating the uniform metadata as described above, the native format metadata, and/or the like) into the module(s) of the volatile memory, such that each module is configured to store only certain portions of the metadata associated with at least one application of the main device.

As used herein, the slicing function may comprise a computer program configured to slice the metadata based on a determination by the volatile memory allocation system, such as by the volatile memory allocation machine learning model, which may be configured to determine how to separate the metadata (e.g., slice the metadata into smaller portions). Thus, the slicing function may comprise carving out particular portions of the metadata, which may be based on the functionality of the metadata, the language of the metadata, the associated application, and/or the like.

In some embodiments, the metadata that the volatile memory allocation machine learning model is applied to may comprise the metadata in its original form and format, and/or it may comprise the metadata as a sliced metadata portion and/or as a segregated metadata portion. Thus, and in some embodiments, the volatile memory allocation machine learning model may be configured to determine the slicing function and/or segregation function and/or the volatile memory allocation machine learning model may be configured only to accept the sliced and/or segregated metadata and not determine the slicing function and/or the segregation function.

In some embodiments, and as shown in block 604, the process flow 700 may include the step of applying the at least one slicing function and/or the at least one segregation function to the metadata to generate the at least one sliced metadata portion and/or the at least one segregated metadata portion. By way of non-limiting example, the volatile memory allocation system may apply at least one of the slicing function and/or the segregation function to the metadata (e.g., in its original metadata format/in the native metadata format and/or in the unified metadata format) to generate the at least one sliced metadata portion and/or the at least one segregated metadata portion. Thus, and in some embodiments, the original metadata and/or the unified metadata may be split and/or segregated into a plurality of metadata portions based on at least one of the slicing function and/or the segregation function. In some embodiments, both the slicing function and the segregation function may be applied in conjunction to the metadata.

In some embodiments, and as shown in block 606, the process flow 700 may include the step of applying the at least one sliced metadata portion or the at least one segregated metadata portion to the volatile memory allocation machine learning model. Similar to the process described above, the volatile memory allocation machine learning model may be configured to—in some embodiments-determine the metadata portion(s) of the original metadata in order to determine the new volatile memory allocation of the metadata portion(s).

In some embodiments, and as shown in block 608, the process flow 600 may include the step of generating-based on the application of the at least one sliced metadata portion or the at least one segregated metadata portion to the volatile memory allocation machine learning model—the new volatile memory allocation for the at least one sliced metadata portion or the at least one segregated metadata portion. By way of non-limiting example, the volatile memory allocation system may determine a new volatile memory allocation for the sliced metadata portion and/or the segregated metadata portion after the sliced metadata portion has been sliced and/or after the metadata has been segregated.

In some embodiments, and as shown in block 610, the process flow 600 may include the step of applying the new volatile memory allocation to the at least one sliced metadata portion or the at least one segregated metadata portion. In some embodiments, such a new volatile memory allocation may also comprise at least one of an upscaling, a downscaling, and/or a constant to the metadata portion(s) based on the new volatile memory allocation.

FIG. 7 illustrates a process flow 700 for training the volatile memory allocation machine learning model based at least on a user-input volatile memory allocation, in accordance with an embodiment of the disclosure. In some embodiments, a system (e.g., similar to one or more of the systems described herein with respect to FIGS. 1A-1C and 2) may perform one or more of the steps of process flow 700. For example, a volatile memory allocation system (e.g., the system 130 described herein with respect to FIG. 1A-1C) may perform the steps of process 700, which may further be configured to implement at least one machine learning and/or an artificial intelligence engine (e.g., such as machine learning model 200 shown in FIG. 2) to perform the steps of process 700.

In some embodiments, and as shown in block 702, the process flow 700 may include the step of generating a memory allocation graphical user interface component to configure a graphical user interface of a user device (e.g., a main device, an end-user device, a user device associated with a manager of the volatile memory allocation system, and/or the like). In some embodiments, the memory allocation graphical user interface component comprises at least one application identifier associated with the at least one application and at least one of the current volatile memory allocation and/or the new volatile memory allocation. As used herein, the term application identifier may refer to a unique sequence of alphanumeric characters, numbers, symbols, and/or the like to identify the application and its associated metadata. In some embodiments, the application identifier may be associated with the at least one application and at least one of the current volatile memory allocation and/or the new volatile memory allocation for the memory allocation graphical user interface component. By way of non-limiting example, the memory allocation graphical user interface component may be used to configure a graphical user interface of a user device to show what a user could see the current memory allocation was/is and what the suggested/new allocation would be for each application of the user device/main device. In some embodiments, the new allocation may be already implemented, but the volatile memory allocation system may be configured to allow an update to the new volatile memory allocation after it has been implemented, such as through a user-input volatile memory allocation, which is described in further detail below.

In some embodiments, and as shown in block 704, the process flow 700 may include the step of receiving a volatile memory allocation input from the user device, wherein the volatile memory allocation input comprises a user-input volatile memory allocation for the metadata. For instance, such a user-input volatile memory allocation may comprise an upscaling, a downscaling, or a constant to the metadata in its native metadata format, in its current volatile memory allocation, in its new volatile memory allocation, and/or the like.

In some embodiments, and as shown in block 706, the process flow 700 may include the step of applying the user-input volatile memory allocation to the metadata of the at least one volatile memory component. In some embodiments, the application of the user-input volatile memory allocation may be applied to a plurality of applications, such as all the applications associated with the user device/main device, whereby the user-input volatile memory allocations are applied at the same time and/or near the same time. In this manner, the user-input volatile memory allocation may be applied to metadata of applications from different volatile memory components (e.g., different volatile memory modules). Further, and in some embodiments, the application of the user-input volatile memory allocation to the metadata may comprise at least one of the upscaling, the downscaling, or the constant.

In some embodiments, the user-input volatile memory allocation may be received at any point, not just when a new volatile memory allocation is determined and/or implemented.

In some embodiments, and as shown in block 708, the process flow 700 may include the step of creating a second training dataset comprising the user-input volatile memory allocation for the metadata. The second training dataset and the first training dataset may be used in conjunction to train the volatile memory allocation machine learning model and/or may be used as singular training datasets to train the volatile memory allocation machine learning model, individually.

In some embodiments, and as shown in block 710, the process flow 700 may include the step of training the volatile memory allocation machine learning model in a second stage using the second training dataset. Similar to the process described above, the volatile memory allocation machine learning model may be configured to—in some embodiments-use and be trained by the user-input volatile memory allocation, either a first time and/or at a second time (e.g., as a feedback loop).

FIG. 8 illustrates a process flow 800 for storing a generating and storing a record of the metadata, in accordance with an embodiment of the disclosure. In some embodiments, a system (e.g., similar to one or more of the systems described herein with respect to FIGS. 1A-1C and 2) may perform one or more of the steps of process flow 800. For example, a volatile memory allocation system (e.g., the system 130 described herein with respect to FIG. 1A-1C) may perform the steps of process 800, which may further be configured to implement at least one machine learning and/or an artificial intelligence engine (e.g., such as machine learning model 200 shown in FIG. 2) to perform the steps of process 800.

In some embodiments, and as shown in block 802, the process flow 800 may include the step of generating a record of the metadata, wherein the record comprises at least one of the current volatile memory allocation and/or the new volatile memory allocation. By way of non-limiting example, the record of the metadata may comprise a journal of cache data and volatile memory allocation(s), whereby the record may comprise the application identifiers of each application associated with the main device/user device, the associated volatile memory allocation(s) (e.g., current, new, user-input, and/or the like), the volatile memory modules for each volatile memory allocation, and/or the like.

In some embodiments, and as shown in block 804, the process flow 800 may include the step of storing the record in a non-volatile memory component. For instance, and in some embodiments, the record may be stored in a hard drive of the main device/user device, on a hard disk, on a (USB), and/or the like. By way of non-limiting example, the storage of the record in the non-volatile memory component may serve to back up the volatile memory allocation(s) and associated application identifiers, such that the volatile memory allocation system can access the volatile memory allocations even after the main device/user device is shut down and/or loses its volatile memory metadata/cached data.

FIG. 9 illustrates a process flow 900 for allowing access to the metadata using encryption, in accordance with an embodiment of the disclosure. In some embodiments, a system (e.g., similar to one or more of the systems described herein with respect to FIGS. 1A-1C and 2) may perform one or more of the steps of process flow 900. For example, a volatile memory allocation system (e.g., the system 130 described herein with respect to FIG. 1A-1C) may perform the steps of process 900, which may further be configured to implement at least one machine learning and/or an artificial intelligence engine (e.g., such as machine learning model 200 shown in FIG. 2) to perform the steps of process 900.

In some embodiments, and as shown in block 902, the process flow 900 may include the step of encrypting the metadata, wherein the metadata is associated with at least one of the current metadata format and/or the unified metadata format. By way of non-limiting example, the volatile memory allocation system may encrypt the metadata before determining the new volatile memory allocation and before comparing it against any other replicated metadata stored in the volatile memory component. In some embodiments, the volatile memory allocation system may encrypt the metadata while the metadata is in a particular format, such as the current metadata format and/or the unified metadata format. Thus, and in some embodiments, the volatile memory allocation system may act to protect the metadata from being accessed by an unauthorized application, system component, and/or the like, associated with the user device/main device and/or other user devices in communication with the user device/main device.

In some embodiments, and as shown in block 904, the process flow 900 may include the step of sharing—in response to the encryption—the encrypted metadata to at least one secondary application. In some embodiments, the sharing of the metadata to at least one secondary application may comprise a sharing to a network, a secondary computing device such as a secondary user device, a secondary main device, a plurality of secondary applications associated with the main device, and/or the like. Thus, and in some embodiments, the volatile memory allocation system may protect the metadata associated with at least one application from being accessed by other secondary applications and/or other secondary user devices when the metadata is stored in the volatile memory component.

In some embodiments, and as shown in block 906, the process flow 900 may include the step of determining whether the at least one secondary application comprises an encryption key associated with the encryption of the metadata. For instance, the volatile memory allocation system may determine whether the at least one secondary application has an encryption key and may be allowed to access the encrypted metadata. In some embodiments, and where the at least one secondary application does comprise at least one encryption key, the volatile memory allocation system may determine whether the at least one encryption key is valid as compared to the encrypted metadata (i.e., whether the at least one encryption key can be used by the secondary application to decrypt the encrypted metadata and/or whether the at least one encryption key is not authorized to decrypt the encrypted metadata).

In some embodiments, and as shown in block 908, the process flow 900 may include the step of validating the encryption key based on the encryption of the metadata. By way of non-limiting example, the volatile memory allocation system may decrypt the encrypted metadata, based on whether the at least one encryption key of the secondary application is the correct encryption key to decrypt the encrypted data (i.e., based on validating the encryption key for the encrypted metadata). However, and in the instance where the secondary application does not comprise the correct encryption key for the encrypted data (e.g., where the encryption key does not match for decrypting the encrypted metadata), the volatile memory allocation system may invalidate the encryption key of the secondary application with respect to the encrypted metadata.

In some embodiments, and as shown in block 910, the process flow 900 may include the step of allowing—in an instance where the encryption key of the at least one secondary application is validated-access to the metadata associated with at least one of the current metadata format and/or the unified metadata format. Thus, and by way of non-limiting example, the volatile memory allocation system may allow access to the encrypted metadata, which may comprise the current metadata format and/or the unified metadata format, by decrypting the encrypted metadata by the secondary application comprising the validated encryption key.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for auto-scaling volatile memory allocation, the system comprising:
    a memory device with computer-readable program code stored thereon;
    at least one processing device operatively coupled to the at least one memory device and the at least one communication device, wherein executing the computer-readable code is configured to cause the at least one processing device to:
        access metadata of at least one volatile memory component, wherein the metadata is associated with at least one application;
        determine a current volatile memory allocation for the metadata;
        determine a current metadata format of the metadata;
        apply the metadata to a volatile memory allocation machine learning model;
        generate, based on the application of the metadata to the volatile memory allocation machine learning model, a new volatile memory allocation for the metadata; and
        apply the new volatile memory allocation to the metadata of the at least one volatile memory component, wherein the application of the new volatile memory allocation to the metadata comprises at least one of an upscaling, a downscaling, or a constant.

2. The system of claim 1, wherein the processing device is further configured to:
    determine a native metadata format of the metadata;
    determine a unified metadata format, wherein the unified metadata format is associated with a recipient component;
    apply a modeler component to the metadata of the application, wherein the modeler component comprises the native metadata format associated with the metadata and the unified metadata format; and
    convert, by the modeler component, the metadata in the native metadata format to a unified metadata comprising the unified metadata format.

3. The system of claim 2, wherein the processing device is further configured to:
    determine a recipient graphical user interface format;
    convert, by the modeler component, the metadata in the native metadata format to the recipient graphical user interface format; and
    generate a recipient graphical user interface, wherein the recipient graphical user interface comprises a recipient graphical user interface component based on the recipient graphical user interface format.

4. The system of claim 1, wherein the new volatile memory allocation is applied to the metadata at an immediate period.

5. The system of claim 1, wherein the processing device is further configured to:
    identify data associated with the application, wherein the data comprises at least one of historical usage data, historical event data, user account data, user account historical usage data, or user account historical event data;
    create a first training dataset comprising the data associated with the application; and
    train the volatile memory allocation machine learning model in a first stage using the first training dataset.

6. The system of claim 1, wherein the new volatile memory allocation is applied when the application is currently running or before the application is started on a user device.

7. The system of claim 1, wherein the processing device is further configured to:
    generate a record of the metadata, wherein the record comprises at least one of the current volatile memory allocation or the new volatile memory allocation; and
    store the record in a non-volatile memory component.

8. The system of claim 1, wherein the metadata comprises at least one sliced metadata portion or at least one segregated metadata portion.

9. The system of claim 8, wherein the processing device is further configured to:
    generate, based on the application of the metadata to the volatile memory allocation machine learning model, at least one slicing function or at least one segregation function for the metadata; and
    apply the at least one slicing function or the at least one segregation function to the metadata to generate the at least one sliced metadata portion or the at least one segregated metadata portion.

10. The system of claim 8, wherein the processing device is further configured to:
    apply the at least one sliced metadata portion or the at least one segregated metadata portion to the volatile memory allocation machine learning model;
    generate, based on the application of the at least one sliced metadata portion or the at least one segregated metadata portion to the volatile memory allocation machine learning model, the new volatile memory allocation for the at least one sliced metadata portion or the at least one segregated metadata portion; and
    apply the new volatile memory allocation to the at least one sliced metadata portion or the at least one segregated metadata portion.

11. The system of claim 1, wherein the processing device is further configured to generate a memory allocation graphical user interface component to configure a graphical user interface of a user device, wherein the memory allocation graphical user interface component comprises at least one application identifier associated with the at least one application and at least one of the current volatile memory allocation or the new volatile memory allocation.

12. The system of claim 11, wherein the processing device is further configured to:
  receive a volatile memory allocation input from the user device, wherein the volatile memory allocation input comprises a user-input volatile memory allocation for the metadata; and
  apply the user-input volatile memory allocation to the metadata of the at least one volatile memory component, wherein the application of the user-input volatile memory allocation to the metadata comprises at least one of the upscaling, the downscaling, or the constant.

13. The system of claim 12, wherein the processing device is further configured to:
  create a second training dataset comprising the user-input volatile memory allocation for the metadata; and
  train the volatile memory allocation machine learning model in a second stage using the second training dataset.

14. The system of claim 1, wherein the processing device is further configured to:
  encrypt the metadata, wherein the metadata is associated with at least one of the current metadata format or the unified metadata format;
  share, in response to the encryption, the encrypted metadata to at least one secondary application;
  determine whether the at least one secondary application comprises an encryption key associated with the encryption of the metadata;
  validate the encryption key based on the encryption of the metadata; and
  allow, in an instance where the encryption key of the at least one secondary application is validated, access to the metadata associated with at least one of the current metadata format or the unified metadata format.

15. A computer program product for auto-scaling volatile memory allocation, wherein the computer program product comprises at least one non-transitory computer-readable medium having computer-readable program code portions embodied therein, the computer-readable program code portions which when executed by a processing device are configured to cause the processor to:
  access metadata of at least one volatile memory component, wherein the metadata is associated with at least one application;
  determine a current volatile memory allocation for the metadata;
  determine a current metadata format of the metadata;
  apply the metadata to a volatile memory allocation machine learning model;
  generate, based on the application of the metadata to the volatile memory allocation machine learning model, a new volatile memory allocation for the metadata; and
  apply the new volatile memory allocation to the metadata of the at least one volatile memory component, wherein the application of the new volatile memory allocation to the metadata comprises at least one of an upscaling, a downscaling, or a constant.

16. The computer program product of claim 15, wherein the processing device is configured to cause the processor to:
  determine a native metadata format of the metadata;
  determine a unified metadata format, wherein the unified metadata format is associated with a recipient component;
  apply a modeler component to the metadata of the application, wherein the modeler comprises the native metadata format associated with the metadata and the unified metadata format; and
  convert, by the modeler component, the metadata in the native metadata format to a unified metadata comprising the unified metadata format.

17. The computer program product of claim 16, wherein the processing device is configured to cause the processor to:
  determine a recipient graphical user interface format;
  convert, by the modeler component, the metadata in the native metadata format to the recipient graphical user interface format; and
  generate a recipient graphical user interface, wherein the recipient graphical user interface comprises a recipient graphical user interface component based on the recipient graphical user interface format.

18. A computer-implemented method for auto-scaling volatile memory allocation, the computer-implementing method comprising:
  accessing metadata of at least one volatile memory component, wherein the metadata is associated with at least one application;
  determining a current volatile memory allocation for the metadata;
  determining a current metadata format of the metadata;
  applying the metadata to a volatile memory allocation machine learning model;
  generating, based on the application of the metadata to the volatile memory allocation machine learning model, a new volatile memory allocation for the metadata; and
  applying the new volatile memory allocation to the metadata of the at least one volatile memory component, wherein the application of the new volatile memory allocation to the metadata comprises at least one of an upscaling, a downscaling, or a constant.

19. The computer-implemented method of claim 18, further comprising:
  determining a native metadata format of the metadata;
  determining a unified metadata format, wherein the unified metadata format is associated with a recipient component;
  applying a modeler component to the metadata of the application, wherein the modeler comprises the native metadata format associated with the metadata and the unified metadata format; and
  converting, by the modeler component, the metadata in the native metadata format to a unified metadata comprising the unified metadata format.

20. The computer-implemented method of claim 19, further comprising:
  determining a recipient graphical user interface format;
  converting, by the modeler component, the metadata in the native metadata format to the recipient graphical user interface format; and
  generating a recipient graphical user interface, wherein the recipient graphical user interface comprises a recipient graphical user interface component based on the recipient graphical user interface format.

* * * * *